United States Patent Office 3,759,901
Patented Sept. 18, 1973

3,759,901
CERTAIN ARYLHYDRAZONALKYL QUATERNARY SALTS
Lewis L. Lincoln and Donald W. Heseltine, Rochester, N.Y., assignors to Eastman Kodak Company, Rochester, N.Y.
No Drawing. Filed Apr. 28, 1969, Ser. No. 819,946
Int. Cl. C07d 91/44
U.S. Cl. 260—240 G
8 Claims

ABSTRACT OF THE DISCLOSURE

Reactive N-substituted, cyclammonium quaternary salts wherein the N-substituent includes substituted alkyl radicals whose terminal carbon atom can be additionally substituted with, for example, a formyl radical, an acetal or thioacetal grouping including cyclic oxyacetals and cyclic thioacetals, or a hydrazono radical which is itself optionally substituted, are useful as chemical intermediates, as photographic addenda such as antifoggants or as nucleating agents in silver halide reversal emulsions. The salts are prepared by reacting a hydro salt of a cyclammonium base with an aliphatic organic compound having an active double bond system between the first and second carbon atoms.

---

The present invention relates to organic synthesis and more particularly to a novel method of preparing reactive, N-substituted, cyclammonium quaternary salts, and to the salts prepared thereby.

It is an object of this invention to provide new compounds that are reactive quaternary salts of heterocyclic nuclei.

It is another object of this invention to provide a novel process for preparing reactive quaternary salts of heterocyclic nuclei.

These and other objects of the instant invention will become additionally apparent from a reading of the following specification and appended claims.

The objects of this invention are accomplished, in one aspect, with heterocyclic quaternary salts comprising a heterocyclic nucleus containing a heterocyclic ring of from 5 to 6 atoms including a quaternary nitrogen atom which has substituted thereon a radical having the formula —(CH$_2$)$_n$—R wherein:

(a) $n$ represents a positive integer having a value of from 2 to about 6, and
(b) R represents a member selected from:
  (1) a formyl radical,
  (2) a radical having the formula

wherein T$_1$ and T$_2$, when taken alone, each represents a member selected from an alkoxy radical and an alkylthio radical, and T$_1$ and T$_2$, when taken together, represent the atoms necessary to complete a cyclic acetal selected from cyclic oxyacetals and cyclic thioacetals containing from 5 to 6 atoms in the heterocyclic acetal ring, and
  (3) a hydrazonomethyl radical.

The subject quaternary salts also include heterocyclic quaternary salts comprising a heterocyclic nucleus containing a heterocyclic ring of 5 to 6 atoms including a quaternary nitrogen atom and from 4 to 5 additional atoms of which from 3 to 4 atoms are carbon atoms and wherein the remaining additional atom is selected from the group consisting of carbon, nitrogen, oxygen, sulfur and selenium atoms. The quaternary nitrogen atom is substituted as described hereinabove.

Advantageously included within the subject invention are quaternary salts having the formula:

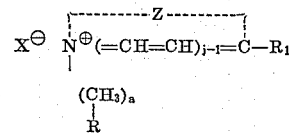

wherein:

(a) Z represents the non-metallic atoms necessary to complete a heterocyclic nucleus containing a heterocyclic ring of 5 to 6 atoms including the quaternary nitrogen atom, with the additional atoms of said heterocyclic ring being selected from carbon, nitrogen, oxygen, sulfur and selenium,
(b) $j$ represents a positive integer of from 1 to 2,
(c) $a$ represents a positive integer of from 2 to 6,
(d) X$^\ominus$ represents an acid anion,
(e) R represents a member selected from:
  (1) a formyl radical,
  (2) a radical having the formula

wherein T$_1$ and T$_2$, when taken alone, each represents a member selected from an alkoxy radical and an alkylthio radical, and T$_1$ and T$_2$, when taken together, represent the atoms necessary to complete a cyclic acetal selected from cyclic oxyacetals and cyclic thioacetals containing from 5 to 6 atoms in the heterocyclic acetal ring, and
  (3) a hydrazonomethyl radical, and
(f) R$_1$ represents either a hydrogen atom, an alkyl radical, an alkylthio radical or an aryl radical such as phenyl and naphthyl.

Exemplary heterocyclic nuclei completed by those atoms represented by Z are such nuclei as, for example, an indole nucleus, an imidazole nucleus, an oxazole nucleus, a thiazole nucleus, a selenazole nucleus, or a quinoline nucleus including those of the imidazole series such as benzimidazole compounds like 5-chlorobenzimidazole and also including compounds of the naphthimidazole series; those of the thiazole series such as thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.; those of the benzothiazole series like benzothiazole, 4-chlorobenzothiazole, 5 - chlorobenzothiazole, 6-chlorobenzothiazole, 7-chlorobenzothiazole, 4-methoxybenzothiazole, 5 - methoxybenzothiazole, 6 - methoxybenzothiazole, 5-iodobenzothiazole, 6-iodobenzothiazole, 4-phenylbenzothiazole, 5 - phenylbenzothiazole, 4-methoxybenzothiazole, 5 - methoxybenzothiazole, 6-methoxybenzothiazole, 5 - iodobenzothiazole, 6-iodobenzothiazole, 4 - ethoxybenzothiazole, 5 - ethoxybenzothiazole, tetrahydrobenzothiazole, 5,6-dimethoxybenzothiazole, 5-hydroxybenzothiazole, 6-hydroxybenzothiazole, etc.; those of the naphthothiazole series such as α-naphthothiazole, 8-methoxy-α-naphthothiazole, 7 - methoxy-α-naphthothiazole, naphtho[2,1-d]thiazole, naphtho[2,3 - d]thiazole, etc.; those of the thionaphteno-7',6',4,5-thiazole series like 4'-methoxythionaphtheno-7',6',4,5-thiazole, etc.; those of the oxazole series such as 4-methyloxazole, 5-methyloxazole, 4-phenyloxazole, 4,5 - diphenyloxazole, 4-ethyloxazole, 4,5-dimethyloxazole, 5-phenyloxazole, etc.; those of the benzoxazole series like benzoxazole, 5-chlorobenzoxazole, 5-methylbenzoxazole, 5 - phenylbenzoxazole, 6-methylbenzoxazole, 5,6 - dimethylbenzoxazole, 4,6 - dimethylbenzoxazole, 5 - methoxybenzoxazole, - 5-ethoxybenzoxazole, 5-chlorobenzoxazole, 6-methoxybenzoxazole, 5-hydroxybenzoxazole, 6-hydroxybenzoxazole, etc.; those of the naphthoxazole series such as α-naphthoxazole; those of the selenazole series like 4-methylselenazole, 4-phenylselenazole, etc.; those of the benzoselenazole series like benzoselenazole, 5 - chlorobenzoselenazole, 5-methoxybenzoselenazole, 5 - hydroxybenzoselenazole, tetrahydrobenzoselenazole, etc.; those of the naphthoselenazole series such as α-naphthoselenazole; and those of the quinoline series such as quinoline, lepidine, etc.

The acid anions represented by $X^\ominus$ include a wide variety of such anions including halide anions like bromide, chloride and iodide, as well as additional anions, e.g., sulfates including sulfate, hydrosulfate, and lower alkylsulfates like methylsulfate and ethylsulfate, aromatic sulfonates such as p-toluene sulfonate and benzenesulfonate, acid anions derived from carboxylic acids like acetate, trifluoroacetate, propionate and a wide variety of other anions including anions such as, for example, perchlorate, cyanate, thiocyanate, sulfamate, benzoate, etc.

Of the radicals represented by R, included are formyl, radicals as described herein having the formula

wherein $T_1$ and $T_2$, when taken alone, each represent either an alkoxy radical typically having from 1 to about 6 carbon atoms in the alkoxy chain or an alkylthio radical preferably having from 1 to 6 carbon atoms in the alkyl chain thereof, and, when taken together, represent the atoms necessary to complete a cyclic acetal which is either a cyclic oxyacetal or cyclic thioacetal radical such as 1,3-dithiolan-2-yl, 1,3-dioxolan-2-yl, 1,3-dithian-2-yl, 1,3-dioxan-2-yl and the like radicals; and hydrazonomethyl radicals including such substituted hydrazonomethyl radicals as a thiosemicarbazonomethyl radical, a phenylhydrazonomethyl radical like phenylhydrazonomethyl, p-tolylhydrazonomethyl, p-sulfophenylhydrazonomethyl, p-nitrophenylhydrazonomethyl, a 2,4 - dinitrophenylhydrazonomethyl, a benzothiazol-2-ylhydrazonomethyl radical, an N-phenylcarbamoylhydrazonomethyl radical and the like hydrazonomethyl radicals.

As employed herein, the terms alkyl radical, alkoxy radical and alkylthio radical include aliphatic, branched and straight chain alkyl, alkoxy and alkylthio radicals typically having from 1 to 6 carbon atoms in the alkyl moiety such as alkyl radicals like methyl, ethyl, propyl, isopropyl, n-butyl, tert-butyl, amyl, hexyl, etc.; alkoxy radicals such as methoxy, ethoxy, propoxy, n-butoxy, tert-butoxy, and the like alkoxy radicals, and alkylthio radicals like methylthio, ethylthio, tert-butylthio, hexylthio, etc. Preferably, the subject alkyl, alkoxy and alkylthio radicals have from 1 to 4 carbon atoms in the alkyl moiety thereof, and they can be substituted or unsubstituted radicals. As used herein, the term aryl radical comprehends such radicals as substituted or unsubstituted phenyl and naphthyl radicals.

Of the reactive cyclammonium quaternary salts described herein, especially advantageous salts include those having the formula:

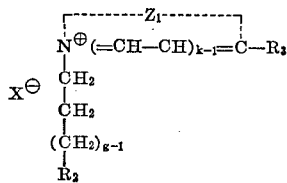

wherein:

(a) $Z_1$ represents the non-metallic atoms necessary to complete a heterocyclic nucleus such as those described elsewhere herein as completed by Z atoms, (b) $k$ represents a positive integer of from 1 to 2,
(c) $g$ represents a positive integer of from 1 to 5,
(d) $X^\ominus$ represents an acid anion such as those described hereinabove,
(e) $R_2$ represents either a formyl radical or a radical having the formula

wherein $T_3$ and $T_4$ are as defined for $T_1$ and $T_2$, and
(f) $R_3$ represents a substituent as defined for $R_1$.

Reactive quaternary salts of this invention include such compounds as:

3-(2-formylethyl)-2-methylbenzothiazolium bromide,
3-(3,3-dimethoxypropyl)-2-ethylbenzimidazolium chloride,
3-(3,3-diethoxypropyl)-2-methylbenzothiazolium iodide,
1-(2-formylethyl)lepidinium bromide,
1-[2-(1,3-dithian-2-yl)ethyl]-2-ethylquinolium iodide,
3-(3,3-diethoxypropyl)-2-methylbenzothiazolium perchlorate,
5-chloro-3-(2-formylethyl)-2-methylbenzoselenazolium bromide,
3-[3,3-di(ethylthio)propyl]-2-methylbenzothiazolium iodide,
3-[3,3-di(ethylthio)propyl]-2-methylbenzothiazolium p-toluene sulfonate,
1-(2-formylethyl)lepidinium bromide,
3-(3-formylpropyl)-2-ethylbenzimidazonium hydrosulfate,
3-(6,6-diethoxy-n-hexyl)-2-methylnaphtho[2,1-d]thiazolium bromide,
3-[3,3-di(methylthio)propyl]-2-methylbenzothiazolium iodide,
3-(2-formylethyl)-2-methylbenzoselenazolium bromide,
3-(3,3-diethylthiopropyl)-2-ethylbenzoxazolium bromide,
3-[2(1,3-dithiolan-2-yl)ethyl]-2-methylbenzothiazolium iodide,
3-[2-(1,3-dioxan-2-yl)ethyl]-2-methylbenzoselenazolium bromide,
3-(5-formylpentyl)-2-ethylbenzoselenazolium bromide,
3-(2-formylethyl)-2-methylnaphtho[2,1-d]thiazolium bromide,
3-(3,3-diethoxypropyl)-2-ethylthionaphtho[2,3-d]thiazolium methylsulfate,
3-[3-(1,3-dioxolan-2-yl)propyl]-2-phenylbenzimidazolium perchlorate,
3-(2-formylethyl)-2-methylnaphtho[2,3-d]thiazolium bromide,
3-[3,3-di(propylthio)propyl]-2-p-tolylbenzothiazolium benzoate,
5-chloro-3-(2-formylethyl)-2-methylbenzothiazolium bromide,
3-(2-formylethyl)-5-methoxy-2-methylbenzothiazolium bromide,
3-(2-formylethyl)-5,6-dimethoxy-2-methylbenzothiazolium bromide.

Other useful quaternary salts of the subject invention include hydrazonoalkyl substituted salts having the formula:

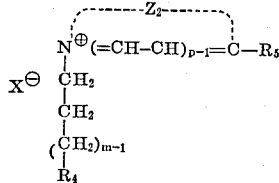

wherein:

(a) $Z_2$ represents the non-metallic atoms necessary to complete a heterocyclic nucleus such as those described elsewhere herein as completed by Z atoms,
(b) *p* represents a positive integer of from 1 to 2,
(c) *m* represents a positive integer of from 1 to 5,
(d) $R_4$ represents a hydrazonomethyl radical,
(e) $R_5$ represents a substituent as defined for $R_1$, and
(f) $X^\ominus$ represents an acid anion.

Exemplary hydrazonomethyl radicals useful herein are, for example, those having the formula $$M-NH-N=CH-$$

wherein M represents an aryl radical such as phenyl or naphthyl which can be substituted with such substituents as hydroxy, alkyl, amino radicals like alkylamino, arylamino, heterocyclic amino, alkoxy, aryloxy, such amido radicals as acyloxy amido arylcarbonamido, alkylcarbonamido, heterocyclic carbonamido, arylsulfonamido, alkylsulfonamido and heterocyclic sulfonamido.

Especially advantageous hydrazonoalkyl substituted quaternary salts of this invention include such salts as those described hereinabove wherein *m* is 1, $R_5$ represents a methyl radical and $R_4$ represents a hydrazonomethyl such as:

(a) a phenylhydrazonomethyl radical,
(b) a p-tolylhydrazonomethyl radical,
(c) a p-sulfophenylhydrazonomethyl radical,
(d) a thiosemicarbazonomethyl radical,
(e) a benzothiazol-2-ylhydrazonomethyl radical,
(f) a p-carboxyphenylhydrazonomethyl radical,
(g) a p-toluenesulfonylhydrazonomethyl radical,
(h) a p-chlorophenylhydrazonomethyl radical,
(i) a p-nitrophenylhydrazonomethyl radical,
(j) an N-phenylcarbamoylhydrazonomethyl radical,
(k) a 2,4-di(methylsulfo)phenylhydrazonomethyl radical,
(l) a 2,4-dinitrophenylhydrazono radical, or
(m) a 3-quinolylhydrazonomethyl radical.

Exemplary hydrazonoalkyl substituted quaternary salts of the invention include such compounds as, for example:

3-[3-(benzothiazol-2-ylhydrazono)propyl]-2-methylbenzothiazolium iodide,
3-[3-(p-carboxyphenylhydrazono)propyl]-2-methylbenzoxazolium chloride,
3-[3-(p-carboxyphenylhydrazono)propyl]benzothiazolium bromide,
2-methyl-3-[3-(p-toluenesulfonylhydrazono)propyl]naphtho[2,1-d]thiazolium iodide,
3-[3-(p-chlorophenylhydrazono)propyl]naphtho[2,1-d]thiazolium bromide,
3-[3-(p-carboxyphenylhydrazono)propyl]-2-ethylnaphtho[2,1-d]thiazolium bromide,
2-methyl-3-[(3-p-nitrophenylhydrazono)propyl]naphtho[2,1-d]thiazolium iodide,
2-methyl-3-[3-(N-phenylcarbamoylhydrazono)propyl]naphtho[2,1-d]thiazolium iodide,
3-[3-(2,4-dimethylsulfonylphenylhydrazono)propyl]-2-methylnaphtho[2,1-d]thiazolium bromide,
3-[3-(p-carboxyphenylhydrazono)propyl]-2-phenylbenzoselenazolium-p-toluene sulfonate,
3-[(3-phenylhydrazono)propyl]benzothiazolium carboxylate,
3-[(3-p-carboxyphenylhydrazono)propyl]-2-methylbenzothiazolium bromide,
3-[(3-p-carboxyphenylhydrazono)propyl]-5-chloro-2-methylbenzothiazolium bromide,
3-[3-(phenylhydrazono)propyl]benzothiazolium benzene sulfonate,
2-ethyl-[3-(3-p-sulfophenylhydrazono)propyl]benzothiazolium iodide,
3-[3-(p-sulfophenylhydrazono)propyl]benzothiazolium iodide,
2-methyl-3-[(3-thiosemicarbazono)propyl]benzothiazolium bromide,
2-methyl-3-[3-thiosemicarbazono)propyl]benzothiazolium hydrosulfate,
2-methyl-3-[(3-phenylhydrazono)propyl]benzothiazolium iodide,
2-methyl-3-[(3-phenylhydrazono)propyl]benzothiazolium thiocyanate,
2-methyl-3-[3-(p-tolylhydrazono)propyl]benzothiazolium iodide,
2-methyl-3-[3-(p-sulfophenylhydrazono)propyl]benzothiazolium chloride,
2-methyl-3-[(3-thiosemicarbazono)propyl]benzothiazolium perchlorate,
2-methyl-3-[(3-phenylhydrazono)propyl]benzothiazolium benzene sulfonate,
2-methyl-3-[3-(p-tolylhydrazono)propyl]benzothiazolium acetate,
2-methyl-3-[3-(p-sulfophenylhydrazono)propyl]benzothiazolium propionate,
2-methyl-3-[3-(benzothiazol-2-ylhydrazono)propyl]benzothiazolium cyanate,
5,6-dichloro-1-ethyl-2-methyl-3-[3-(p-sulfophenylhydrazono)propyl]benzoimidazolium bromide,
5,6-dichloro-3-[3-(2-benzothiazolylhydrazono)propyl]-1-ethyl-2-methylbenzimidazolium bromide,
5,6-dichloro-2-methyl-3-[3-(3-quinolylhydrazono)propyl]-1-ethylbenzimidazolium bromide,
5-chloro-2-methyl-3-[3-(p-tolylhydrazono)propyl]benzoselenazolium bromide,
2-methyl-3-[3-(p-toluenesulfonylhydrazono)propyl]benzothiazolium bromide,
2-methyl-3-[3-(p-tolylhydrazono)propyl]benzothiazolium bromide,
3-[3-(2,4-dinitrophenylhydrazono)propyl]benzothiazolium bromide,
5,6-dichloro-1-ethyl-2-methyl-3-[3-(p-tolylhydrazono)propyl]benzimidazolium bromide,
5,6-dichloro-1-ethyl-2-methyl-3-[3-(p-nitrophenylhydrazono)propyl]benzimidazolium bromide,
3-[3-(p-carboxyphenylhydrazono)propyl]-5-methoxy-2-methylbenzothiazolium bromide,
3-[3-(p-carboxyphenylhydrazono)propyl]-5,6-dimethoxy-2-methylbenzothiazolium bromide,
3-[3-(p-carboxyphenylhydrazono)propyl]-2-methylnaphtho[2,3-d]thiazolium bromide.

The objects of this invention are accomplished, in a second aspect, with processes for preparing the reactive, N-substituted, cyclammonium quaternary salts of this invention, which processes include reacting a cyclammonium hydro salt compound with another compound containing an activated double bond system such as ethylenic unsaturation between the first and second carbon atoms of an aliphatic chain. The subject processes include those for preparing reactive quaternary salts having the formula:

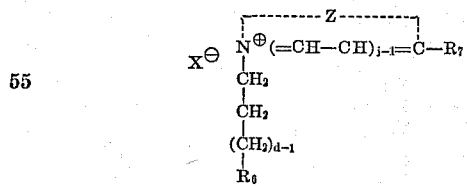

wherein:

(a) Z represents the atoms necessary to complete a heterocyclic nucleus such as those defined hereinabove,
(b) *j* represents a positive integer of from 1 to 2,
(c) *d* represents a positive integer having a value of from 1 to 5,
(d) $X^\ominus$ represents an acid anion,
(e) $R_6$ represents:
    (1) a group having the formula

wherein T represents a member selected from a hydrogen atom, a hydroxyl radical, an alkyl radical having preferably from 1 to 4 carbon atoms, and an alkoxy radical preferably having from 1 to 4 carbon atoms,
(2) a sulfo radical,
(3) a cyano radical,
(4) an alkylsulfonyl radical wherein the alkyl moiety has from 1 to 4 carbon atoms, and
(5) a radical having the formula

wherein $T_1$ and $T_2$, are as previously defined, and $R_7$ is as described in $R_1$, said process comprising reacting a compound having the formula:

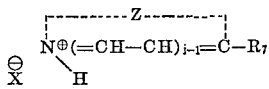

wherein Z, $j$, $X^\ominus$ and $R_1$ are as previously defined, with a compound having the formula:

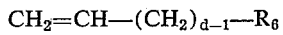

wherein $d$ and $R_6$ are as previously defined.

The reaction medium is advantageously an inert organic solvent that exhibits moderate polarity and dissolves both the acid anion and the quaternary salt reagents, but which is not a solvent for the reaction product. Exemplary of such a medium are such solvents as acetonitrile and dimethylacetamide. No reaction catalysts are generally required and the reaction temperature is conventionally variable from about 20° C. to about 30° C., although wider reaction temperature can be employed so long as the reagents remain in solution and are not subjected to heating in excess of their decomposition temperatures. For example, reflux conditions can be employed to promote the reaction. The reaction products precipitate from solution and can then be purified by such conventional means as solvent washing or sequential crystallization from solvents such as, for example, acetone, ethers, alcohols such as methanol, ethanol and propanol, mixtures of alcohol and water, etc.

The subject advantageous processes also include a process for the preparation of quaternary salts having the formula:

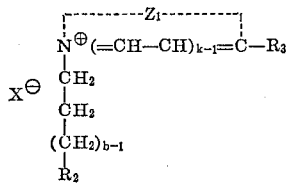

wherein:
(a) $Z_1$ represents the atoms necessary to complete a heterocyclic nucleus, such as defined hereinabove as represented by Z atoms,
(b) $k$ represents a positive integer of from 1 to 2,
(c) $b$ represents a positive integer of from 1 to 5,
(d) $X^\ominus$ represents an acid anion,
(e) $R_2$ represents a member selected from a formyl radical and a radical having the formula

wherein $T_3$ and $T_4$ are as defined for $T_1$ and $T_2$, and
(f) $R_3$ is as previously defined, said process comprising reacting a compound having the formula:

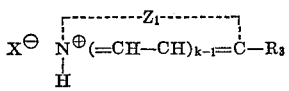

wherein $Z_1$, $k$, $X^\ominus$, and $R_3$ are as previously defined, with a compound having the formula:

$$CH_2=CH-(CH_2)_{b-1}-R_2$$

wherein $b$ and $R_2$ are as previously defined.

Particularly advantageous processes include those for preparing the salts mentioned immediately hereinabove wherein $R_3$ represents a methyl radical, $X^\ominus$ represents a halide anion and $b$ has a value of 1.

Additional reactive quaternary salts prepared according to the processes of this invention are the N-hydrazonoalkyl substituted quaternary salts of the type described in detail hereinabove. The processes for preparing hydrazonoalkyl substituted salts include the process for preparing quaternary salts having the formula:

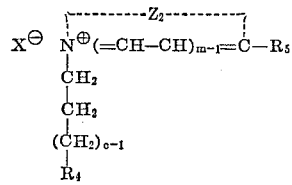

wherein:
(a) $Z_2$ represents the atoms necessary to complete a heterocyclic nucleus such as defined hereinabove as represented by Z atoms,
(b) $m$ represents a positive integer of from 1 to 2,
(c) $c$ represents a positive integer of from 1 to 5,
(d) $X^\ominus$ represents an acid anion,
(e) $R_4$ represents a hydrazonomethyl radical, and
(f) $R_5$ is as previously defined, said process comprising the steps of:
(a) reacting a compound having the formula:

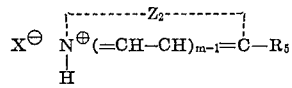

wherein $Z_2$, $m$, $R_5$ and $X^\ominus$ are as previously defined, with a compound having the formula:

$$CH_2=CH-(CH_2)_{c-1}-T_5$$

wherein $c$ is as previously defined and $T_5$ represents an acyl radical such as a formyl radical, an acetyl radical and a propionyl radical to prepare an intermediate compound having the formula:

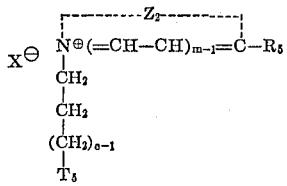

wherein $Z_2$, $m$, $R_5$, $X^\ominus$, $c$ and $T_5$ are as previously defined, and thereafter.
(b) reacting said intermediate compound with a hydrazine compound having 2 hydrogen atoms attached to the same nitrogen atom.

In the subject processes for the preparation of hydrazonoalkyl substituted quaternary salts, especially advantageous hydrazine compounds having 2 hydrogen atoms attached to the same nitrogen atom and which are reacted with the intermediate compounds mentioned hereinabove, include such hydrazine compounds as:

phenylhydrazine,
p-tolylhydrazine,
p-sulfophenylhydrazine,
thiosemicarbazide,
benzothiazol-2-ylhydrazine,
2,4-dinitrophenylhydrazine,
p-carboxyphenylhydrazine,
p-tolylsulfohydrazine, p-chlorophenylhydrazine,
p-nitrophenylhydrazine,
N-phenylcarbamoylhydrazine, and
2,4-di(methylsulfo)phenylhydrazine.

Particularly advantageous processes include those for preparing hydrazonoalkyl substituted salts such as those described hereinabove wherein $R_5$ represents a methyl radical, $X^\ominus$ represents a halide anion and the hydrazonoalkyl radical represented by $R_4$ is selected from:

(a) a phenylhydrazonomethyl radical,
(b) a p-tolylhydrazonomethyl radical,
(c) a p-sulfophenylhydrazonomethyl radical,
(d) a thiosemicarbazonomethyl radical,
(e) a benzothiazol-2-ylhydrazonomethyl radical,
(f) a p-carboxyphenylhydrazonomethyl radical,
(g) a p-tolylsulfohydrazonomethyl radical,
(h) a p-chlorophenylhydrazonomethyl radical,
(i) a p-nitrophenylhydrazonomethyl radical,
(j) an N-phenylcarbamoylhydrazonomethyl radical,
(k) a 2,4-di(methylsulfo)phenylhydrazonomethyl radical,
(l) a 2,4-dinitrophenylhydrazono radical, or
(m) a 3-quinolylhydrazonomethyl radical.

The conveniently prepared, reactive quaternary salts of this invention are useful as photographic addenda in silver halide photographic emulsions and especially in gelatino-silver halide emulsions as, for example, antifoggants, etc., and as chemical intermediates in, for example, the production of photographic dyestuffs by condensation reactions. Exemplary of a typical dye condensation to prepare a symmetrical photographic sensitizing dye is the reaction of a subject quaternary salt with an excess amount (molar) of a condensing reagent such as diethoxymethyl acetate, 1,3,3-trimethoxypropene and the like. Unsymmetrical photographic dyes can be prepared by reacting the quaternary salts of this invention with a dye intermediate such as p-dimethylaminobenzaldehyde, 5 - acetanilidomethylene-3-ethylrhodanine, 3 - ethylmercaptobenzothiazolium ethylsulfate, etc. The dyes so prepared are useful in photographic elements either as spectral sensitizers for a photosensitive species such as silver halide or serving alternative functions wherein organic dyestuffs are advantageously employed.

The subject hydrazonoalkyl substituted quaternary salts are additionally advantageous as nucleating agents or fogging agents in silver halide reversal or direct positive emulsions used in positive-working photographic elements designed for reversal processing to prepare direct positive photographic images without utilizing an intermediate developed negative image. Such direct postive emulsions form latent images predominantly inside the silver halide grains.

The photographic emulsions generally used in reversal processes are gelatino-silver halide emulsions such as silver bromide, silver bromoiodide or silver chloroiodide emulsions. They need not contain sensitizing dyes although certain such dyes may be added to reversal emulsions for the purpose of inducing aerial fog, as well as to widen spectral sensitization. Internal latent image emulsions are typically undigested or if digested, the digestion is carried out without the use of surface sensitizers. An emulsion of this type, known as Burton's emulsion is described in Wall "Photographic Emulsions,' 1927, pp. 52 and 53. Further types of suitable reversal emulsions are internal latent image emulsions described in Davey and Knott, U.S. Pat. 2,592,250 and Luckey et al., U.S. Pat. 2,996,382.

The following examples are included for a further understanding of the invention.

EXAMPLE 1

Preparation of 3 - (2 - formylethyl)-2-methylbenzothiazolium bromide: 2-methylbenzothiazolium hydrobromide (1 mol., 11.5 g.) and acrolein (1 mol.+150% excess, 13.5 g.) are mixed in dimethylacetamide (150 ml.) and the mixture is stirred overnight at about 22° C. The pale yellow solid which forms is then collected on a filter funnel, washed with an excess of acetone and dried. The yield of crude salt is 110 g. (77%), M.P. 249–250° C. dec.

EXAMPLE 2

Preparation of 5 - chloro-3-(2-formylethyl)-2-methylbenzoselenazolium bromide: 5-chloro - 2 - methylbenzoselenazolium bromide (1 mol., 31.1 g.) and acrolein (1 mol.+100% excess, 11.2 g.) are mixed in dimethylacetamide (100 ml.) and the mixture stirred overnight at a temperature of 22° C. The white solid that forms is collected on a filter funnel, washed with acetone and dried. Yield of crude salt is 33 g. (90%), M.P. 271°–273° C.

EXAMPLE 3

Preparation of 5,6-dichloro-1-ethyl-3-(2-formylethyl)-2-methylbenzimidazolium bromide: 5,6-dichloro-1-ethyl-2-methylbenzimidazolium hydrobromide (1 mol., 31 g.) and acrolein (1 mol. plus 100% excess, 11.2 g.) are mixed in 800 ml. dimethylacetamide, and the mixture is heated with stirring until all solids are dissolved. The heat is then removed and the solution is stirred at 22° C. with stirring overnight. At this point ether (1 l.) is added and the product precipitates from solution as a white solid. The white solid is collected on a buchner funnel, washed with ether and dried. The product is used without further purification. Yield is theoretical, M.P. 279° to 281° C.

EXAMPLE 4

Additional quaternary salts are prepared utilizing the procedures of Example 1. The heterocyclic reagents are reacted with acrolein as in Example 1, with particular heterocyclic reagents, quaternary salt reaction products, yield and melting points being summarized below in tabular form.

| Heterocyclic reagent | Quaternary salt reaction product | Melting point, °C. | Yield, percent |
|---|---|---|---|
| 5-chloro-2-methyl benzothiazolium hydrobromide. | 5-chloro-3-(2-formylethyl)-2-methylbenzothiazolium bromide. | 237–240 | 57 |
| 5-methoxy-2-methyl-benzothiazolium hydrobromide. | 3-(2-formylethyl)-5-methoxy-2-methylbenzothiazolium bromide. | 197–198 | 70 |
| 5,6-dimethoxy-2-methylbenzothiazolium hydrobromide. | 5,6-dimethoxy-3-(2-formylethyl)-2-methylbenzothiazolium bromide. | Oil | 20 |
| 2-methylnaphtho [2,3-d]thiazolium hydrobromide. | 3-(2-formylethyl)-2-methylnaptho [2,3-d]thiazolium bromide. | Oil | 10 |
| 4-methylquinolium hydroiodide. | 1-(2-formylethyl)-4-methylquinolium iodide. | 165–167 | 72 |

EXAMPLE 5

Preparation of 3-(3,3-diethoxypropyl)-2-methylbenzothiazolium iodide: 3-(2-formylethyl)-2-methylbenzothiazolium iodide (1 mol., 64 g.) is suspended in absolute ethyl alcohol (150 ml.) with 30%–32% hydrobromic acid in acetic acid (2 ml.) added, and the mixture is stirred at about 22° C. one hour. A small portion of the alcohol solution is removed and stirred with an excess of ether. Ether is then decanted from the sticky residue; more ether is added with stirring; ether is again decanted, and the sticky residue stirred with a small amount of acetone. The sticky residue dissolves in the acetone and the solution is treated with ether portionwise until it becomes cloudy, which cloudiness is followed by the product crystallizing from solution as a yellow solid. The main solution is then treated with the seed crystals and stirred at room temperature for one hour. The yellow crystals are then collected on a filter funnel, washed with ether and dried. The yield of pure product is 48 g. (81%), M.P. 115–116° C. with dec. at 145° C. Using procedures similar to those of Examples 1, 2 and 3, additional compounds of this invention can be prepared conveniently by reacting a heterocyclic hydro salt reagent with additional aliphatic compounds containing activated double bond systems.

EXAMPLE 6

Utilizing procedures like those of Example 1, the following preparations can be conveniently accomplished:

(a) 1 - ethyl - 2 - methyl - 3 - (2 - propionylethyl)benzimidazolium bromide is prepared by reacting 1-ethyl-2-methylbenzimidazolium hydrobromide and ethylvinylketone, (b) 3-(2-cyanoethyl)-2-methylbenzoxazolium iodide is prepared by reacting 2-methylbenzoxazolium hydroiodide and acrylonitrile, (c) 2 - propyl - 3 - (2 - carboxyethyl)naphtho[2,3 - d] selenazolium chloride is prepared by reacting 2-propylnaphtho[2,3-d]selenazolium hydrochloride and acrylic acid, (d) 3 - [3,3 - di(ethylthio)propyl] - 2 - methylbenzothiazolium hydrosulfate is prepared by reacting 2-methylbenzothiazolium hydrosulfate and vinyldi(ethylthio)methane-[3,3-di(ethylthio)prop-1-ene], (e) 3 - [2 - (1,3 - dithiolan - 2 - yl)ethyl] - 2 - ethylbenzothiazolium iodide is prepared by reacting 2-ethylbenzothiazolium hydroiodide and 1,3-dithiolan-2-ylethylene.

Additional reactive quaternary salts can be prepared in a similar fashion.

As described hereinabove, the subject hydrazonoalkyl substituted quaternary salts are advantageous as nucleating (fogging) agents in silver halide reversal emulsions. Conventionally, those salts are reducing agents due to the presence of reactive substituents such as hydrazine derivatives. Exemplary preparations are described as follows.

EXAMPLE 7

Preparation of 2-methyl-3-thiosemicarbazonopropyl benzothiazolium bromide; thiosemicarbazide (1 mol. +10% excess, 10 g.) is dissolved in a refluxing solution of equal parts ethyl alcohol and water (150 ml.), and 3-(2-formylethyl)-2-methylbenzothiazolium bromide prepared according to the procedure of Example 1 is added, and all solids are dissolved. Concentrated sulfuric acid (4 drops) is then added, and the entire solution is stirred for one-half hour. The solution is then chilled with stirring by means of an ice bath and after several minutes, the product separates from solution as an oil that quickly becomes crystalline. The light tan crystals are collected on a filter funnel, washed with acetone and dried. The yield of crude product is 20 g. (56%), M.P. 177–178° C.

EXAMPLE 8

Preparation of 2-methyl-3-(3-phenylhydrazonopropyl) benzothiazolium bromide: 2-(2-formylethyl)-2-methylbenzothiazolium bromide (1 mol., 14.3 g.), as described in Example 1, is partially dissolved in ethyl alcohol (100 ml.) with stirring. Phenylhydrazine (1 mol.+10% excess, 11.9 g.) is added followed by the addition of concentrated sulfuric acid (4 drops), and the mixture is stirred at about 22° C. for 15 minutes. At this point, heat is applied, the mixture is heated to reflux temperature with stirring and the product is crystallized from solution as a white solid. The solid is collected on a filter funnel, washed with ethyl alcohol and dried. After one recrystallization from water, the yield of product is 10 g. (53%), M.P. 162–163° C.

EXAMPLE 9

Preparation of 2-methyl-3-(3-p-tolylhydrazonopropyl) benzothiazolium bromide: 3-(2-formylethyl)-2-methylbenzothiazolium bromide (1 mol., 14.3 g.), as prepared in Example 1, and p-tolylhydrazine hydrochloride (1 mol. +10% excess, 8.7 g.) are dissolved in water (100 ml.) with stirring. After stirring at about 22° C. one minute the product crystallizes from solution. The mixture is stirred at about 22° C. for 15 minutes, and the crystalline salt is collected on a filter funnel, washed well with an excess of water and dried. After one recrystallization from a mixture of methyl alcohol and water in a 1:1 ratio, the yield of product is 11 g. (56%), M.P. 163–164° C.

EXAMPLE 10

Preparation of 2-methyl - 3 - (p-sulfophenylhydrazonopropyl)benzothiazolium bromide: 3-(2-formylethyl)-2-methylbenzothiazolium bromide (1 mol., 14.3 g.), as prepared in Example 1, is dissolved in water (200 ml.) with stirring, then gravity filtered and treated with a suspension of p-hydrazino-benzene-sulfonic acid (1 mol., 9.4 g.) in water (400 ml.) with stirring. After 30 minutes of stirring at about 22° C., a buff colored solid precipitates from solution. After the entire solution has stirred at the 22° C. temperature, the solid is collected on a filter funnel, washed with an excess of water and dried. The product is then stirred with refluxing methyl alcohol (500 ml.) collected on a filter funnel and dried. The yield of product is 20 g. (87%), M.P. 258–259° C.

EXAMPLE 11

Preparation of 2-methyl-3-(benzothiazol-2-ylhydrazonopropyl)benzothiazolium bromide: 3 - (2 - formylethyl)-2-methylbenzothiazolium bromide (1 mol., 14.3 g.), as prepared in Example 1, and 2-hydrazinobenzothiazole (1 ml., 8.15 g.) are mixed in ethyl alcohol (150 ml.) with stirring at about 22° C. Concentrated sulfuric acid (4 drops) is added while stirring is continued, and the entire mixture is stirred at about 22° C. The mixture is then heated to reflux temperature with striring, and the product precipitates from solution as a white solid. The solid is collected from the hot solution on a filter funnel, washed with an excess of ethyl alcohol and dried. The product is then refluxed in ethyl alcohol (200 ml.) collected on a filter funnel and dried. Yield of white solid is 16 g. (90%), M.P. 160–161° C. with dec.

EXAMPLE 12

Utilizing procedures like those described in Examples 7–11, additional hydrazonoalkyl substituted quaternary salts are prepared. The reagents, reaction products, yield and melting points are summarized below in tabular form.

| Reagents | Reaction product | Melting point, °C. | Yield, percent |
|---|---|---|---|
| 5,6-dichloro-1-ethyl-3-(2-formylethyl)-2-methylbenzimidazolium hydrobromide and p-sulfophenylhydrazine. | 5,6-dichloro-1-ethyl-2-methyl-3-[3-(p-sulfophenylhydrazono)propyl]benzimidazolium bromide. | [1] 289–290 | 40 |
| 5,6-dichloro-1-ethyl-3-(2-formylethyl)-2-methylbenzimidazolium hydrobromide and 2-benzothiazolylhydrazine. | 5,6-dichloro-3-[3-(2-benzothiazolylhydrazono)propyl]-1-ethyl-2-methylbenzimidazolium bromide. | [1] 140–141 | 39 |
| 5,6-dichloro-1-ethyl-3-(2-formylethyl)-2-methylbenzimidazolium hydrobromide and 3-hydrazinoquinoline. | 5,6-dichloro-2-methyl-3-[3-(3-quinolylhydrazono)propyl]-1-ethylbenzimidazolium bromide. | 191–192 | 25 |
| 5-chloro-3-(2-formylethyl)-2-methylbenzoselenazolium hydrobromide and p-tolylhydrazine. | 5-chloro-2-methyl-3-[3-(p-tolylhydrazono)propyl]benzoselenazolium bromide. | [1] 89–90 | 59.9 |
| 3-(2-formylethyl)-2-methylbenzothiazolium hydrobromide and p-toluenesulfonylhydrazine. | 2-methyl-3-[3-(p-toluenesulfonylhydrazono)propyl]benzothiazolium bromide. | 126–128 | 50 |
| 3-(2-formylethyl)-2-methylbenzothiazolium hydrobromide and p-carboxyphenylhydrazine. | 3-[3-(p-carboxyphenylhydrazono)propyl]-2-methylbenzothiazolium bromide. | 160–162 | 75 |
| 3-(2-formylethyl)-2-methylbenzothiazolium hydrobromide and tolylhydrazine. | 2-methyl-3-[3-(p-tolylhydrazono)propyl]benzothiazolium bromide. | [1] 163–164 | 77 |

| Reagents | Reaction product | Melting point, °C. | Yield, percent |
|---|---|---|---|
| 3-(2-formylethyl)benzothiazolium hydrobromide and 2,4-dinitrophenylhydrazine. | 3-[3-(2-4-dinitrophenylhydrazono)propyl]benzothiazolium bromide. | [1] 189-190 | 70 |
| 5,6-dichloro-1-ethyl-3-(2-formylethyl)-2-2-methylbenzimidazolium hydrobromide and p-tolylhydrazine. | 5,6-dichloro-1-ethyl-2-methyl-3-[3-(p-tolylhydrazono)propyl]benzimidazolium bromide. | [1] 163-164 | 98 |
| 5,6-dichloro-1-ethyl-3-(2-formylethyl)-2-methylbenzimidazolium hydrobromide and p-nitrophenylhydrazine. | 5,6-dichloro-1-ethyl-2-methyl-3-[3-(p-nitrophenylhydrazono)propyl]benzimidazolium bromide. | [1] 167-168 | 80 |
| 5-chloro-3-(2-formylethyl)-2-methylbenzothiazolium hydrobromide and p-carboxyphenylhydrazine. | 3-[3-(p-carboxyphenylhydrazono)propyl]-5-chloro-2-methylbenzothiazolium bromide. | [1] 127-129 | 40 |
| 3-(2-formylethyl)-5-methoxy-2-methylbenzothiazolium hydrobromide and p-carboxyphenylhydrazine. | 3-[3-(p-carboxyphenylhydrazono)propyl]-5-methoxy-2-methylbenzothiazolium bromide. | [1] 103-105 | 55 |
| 5,6-dimethoxy-3-(2-formylethyl)-2-methylbenzothiazolium hydrobromide and p-carboxyphenylhydrazine. | 3-[3-(p-carboxyphenylhydrazono)propyl]-5,6-dimethoxy-2-methylbenzothiazolium bromide. | [1] 148-151 | 10 |
| 3-(2-formylethyl)-2-methyl-naphtho[2,3-d]thiazolium hydrobromide and p-carboxyphenylhydrazine. | 3-[3-(p-carboxyphenylhydrazono)propyl]-2-methylnaphtho[2,3-d]thiazolium bromide. | [1] 121-124 | 5 |
| 1-(2-formylethyl)-4-methylquinolinium hydroiodide and p-carboxyphenyl hydrazine. | 1-[3-(p-carboxyphenylhydrazono)propyl]-4-methylquinolinium iodide. | 126-128 | 90 |
| 3-(2-acetylethyl)benzothiazolium hydrobromide and 2,4-dinitrophenyl hydrazine. | 3-[3-2,4-dinitrophenylhydrazono)butyl]benzothiazolium bromide. | [1] 189-190 | 70 |
| 3-(2-propionylethyl)-2-methylbenzothiazolium hydrobromide and p-toluenesulfonyl hydrazine. | 2-methyl-3-[3-(p-toluenesulfonylhydrazono)pentyl]benzothiazolium bromide. | 126-128 | 50 |

[1] Dec.

The invention has been described in detail with particular reference to preferred embodiments thereof, but, it will be understood that variations and modifications can be effected within the spirit and scope of the invention.

We claim:

1. A quaternary salt having the formula:

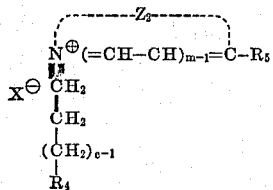

wherein:
(a) $Z_2$ represents the non-metallic atoms necessary to complete a heterocyclic nucleus selected from the group consisting of an indole nucleus, an imidazole nucleus, an oxazole nucleus, a thiazole nucleus, a selenazole nucleus and a quinoline nucleus,
(b) $m$ represents a positive integer of from 1 to 2,
(c) $c$ represents a positive integer of from 1 to 5,
(d) $R_4$ represents a hydrazonomethyl radical of the formula M—NH—N=CH— wherein M represents phenyl or naphthyl,
(e) $R_5$ represents a member selected from the group consisting of a hydrogen atom, a $C_1$–$C_6$ alkyl radical, a $C_1$–$C_6$ alkylthio radical and phenyl or naphthyl, and
(f) $X^\ominus$ represents an acid anion.

2. A quaternary salt having the formula:

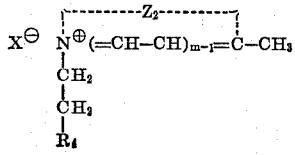

wherein:
(a) $Z_2$ represents the non-metallic atoms necessary to complete a heterocyclic nucleus selected from the group consisting of an indole nucleus, an imidazole nucleus, an oxazole nucleus, a thiazole nucleus, a selenazole nucleus and a quinoline nucleus,
(b) $m$ represents a positive integer having a value of from 1 to 2,
(c) $X^\ominus$ represents an acid anion, and (d) $R_4$ represents a hydrazonomethyl radical of the formula M—NH—N=CH— wherein M represents phenyl or naphthyl.

3. A quaternary salt as described in claim 2 wherein $X^\ominus$ represents a halide anion and $R_4$ represents a hydrazonomethyl radical selected from the group consisting of:

(a) a phenylhydrazonomethyl radical,
(b) a p-tolylhydrazonomethyl radical,
(c) a p-sulfophenylhydrazonomethyl radical,
(d) a thiosemicarbazonomethyl radical,
(e) a benzothiazol-2-ylhydrazonomethyl radical,
(f) a p-carboxyphenylhydrazonomethyl radical,
(g) a p-tolylsulfohydrazonomethyl radical,
(h) a p - chlorophenylhydrazonomethyl radical,
(i) a p - nitrophenylhydrazonomethyl radical,
(j) an N-phenylcarbamoylhydrazonomethyl radical,
(k) a 2,4 - di(methylsulfo)phenylhydrazonomethyl radical,
(l) a 2,4-dinitrophenylhydrazono radical, or
(m) a 3-quinolylhydrazonomethyl radical.

4. 2 - methyl - 3 - [3 - (thiosemicarbazonopropyl)] benzothiazolium bromide.

5. 2 - methyl - 3 - ( 3 - phenylhydrazonopropyl)benzothiazolium bromide.

6. 2 - methyl - 3 - (p - tolylhydrazonopropyl)benzothiazolium bromide.

7. 2 - methyl - 3 - (p - sulfophenylhydrazonopropyl) benzothiazolium bromide.

8. 2 - methyl - 3 - (benzothiazol - 2 - ylhydrazonopropyl)benzothiazolium bromide.

References Cited
UNITED STATES PATENTS

| | | | |
|---|---|---|---|
| 2,930,795 | 3/1960 | Biel | 260—240 G |
| 3,158,608 | 11/1964 | Raue | 260—240 G |
| 3,238,198 | 3/1966 | Raue et al. | 260—240 G |
| 3,701,783 | 10/1972 | Barr et al. | 260—308 |
| 3,192,205 | 6/1965 | Depoorter et al. | 260—304 |
| 3,238,198 | 3/1966 | Raue et al. | 260—286 Q |
| 3,414,568 | 12/1968 | Collet et al. | 260—307 D |
| 3,483,195 | 12/1969 | Jeffreys | 260—307 D |

RICHARD J. GALLAGHER, Primary Examiner

U.S. Cl. X.R.

96—59, 109; 260—286 Q, 298, 304, 307 O, 309.2